No. 690,880.  
A. J. ROTH.  
VOTING MACHINE.  
(Application filed Jan. 10, 1901.)  
Patented Jan. 7, 1902.

(No Model.) 7 Sheets—Sheet 1.

FIG. 1.

WITNESSES:  
G. H. Blaker.  
Laura Hitt.

INVENTOR  
Albert J. Roth,  
BY V. H. Lockwood  
His ATTORNEY.

No. 690,880. Patented Jan. 7, 1902.
A. J. ROTH.
VOTING MACHINE.
(Application filed Jan. 10, 1901.)
(No Model.) 7 Sheets—Sheet 2.

WITNESSES:
G. H. Blaker
Laura Hitt

INVENTOR
Albert J. Roth
BY V. H. Lockwood
His ATTORNEY.

No. 690,880. Patented Jan. 7, 1902.
A. J. ROTH.
VOTING MACHINE.
(Application filed Jan. 10, 1901.)
(No Model.) 7 Sheets—Sheet 4.

No. 690,880. Patented Jan. 7, 1902.
A. J. ROTH.
VOTING MACHINE.
(Application filed Jan. 10, 1901.)
(No Model.) 7 Sheets—Sheet 6.

FIG. 8.

WITNESSES: G. H. Blake, Laura Hitt

INVENTOR Albert J. Roth,
BY V. H. Lockwood.
His ATTORNEY.

No. 690,880. Patented Jan. 7, 1902.
A. J. ROTH.
VOTING MACHINE.
(Application filed Jan. 10, 1901.)
(No Model.) 7 Sheets—Sheet 7.

UNITED STATES PATENT OFFICE.

ALBERT J. ROTH, OF LAFAYETTE, INDIANA.

VOTING-MACHINE.

SPECIFICATION forming part of Letters Patent No. 690,880, dated January 7, 1902.

Application filed January 10, 1901. Serial No. 42,819. (No model.)

*To all whom it may concern:*

Be it known that I, ALBERT J. ROTH, of Lafayette, county of Tippecanoe, and State of Indiana, have invented a certain new and useful Voting-Machine; and I do hereby declare that the following is a full, clear, and exact description thereof, reference being had to the accompanying drawings, in which like characters refer to like parts.
The object of this invention is to provide a small, compact, and very strong voting-machine that meets the usual requirements of election laws.
  The chief object is to make a machine of the kind that is so strong as to resist interference or breakage and so simple in its mechanical elements that a mechanic of ordinary skill can readily understand or repair the same or take it apart and put it together if there should be need of it.
  To the foregoing end I provide novel locking means that are so strong as to prevent breakage or interference regardless of how roughly the push-buttons may be used. I also provide a very strong means of locking all the individual-candidate push buttons and rods against action when a straight ticket is voted. In connection with the foregoing I provide a novel unlocking means that is very positive in its operation. I also provide a novel means for locking the device against operation by an independent detachable key. These and various other features of my invention will more fully appear from the accompanying drawings and the following description and claims.
  In the drawings,
Fig. 5 is a section on the line B B, Fig. 1, showing the push-bars unoperated.

Figure 1:
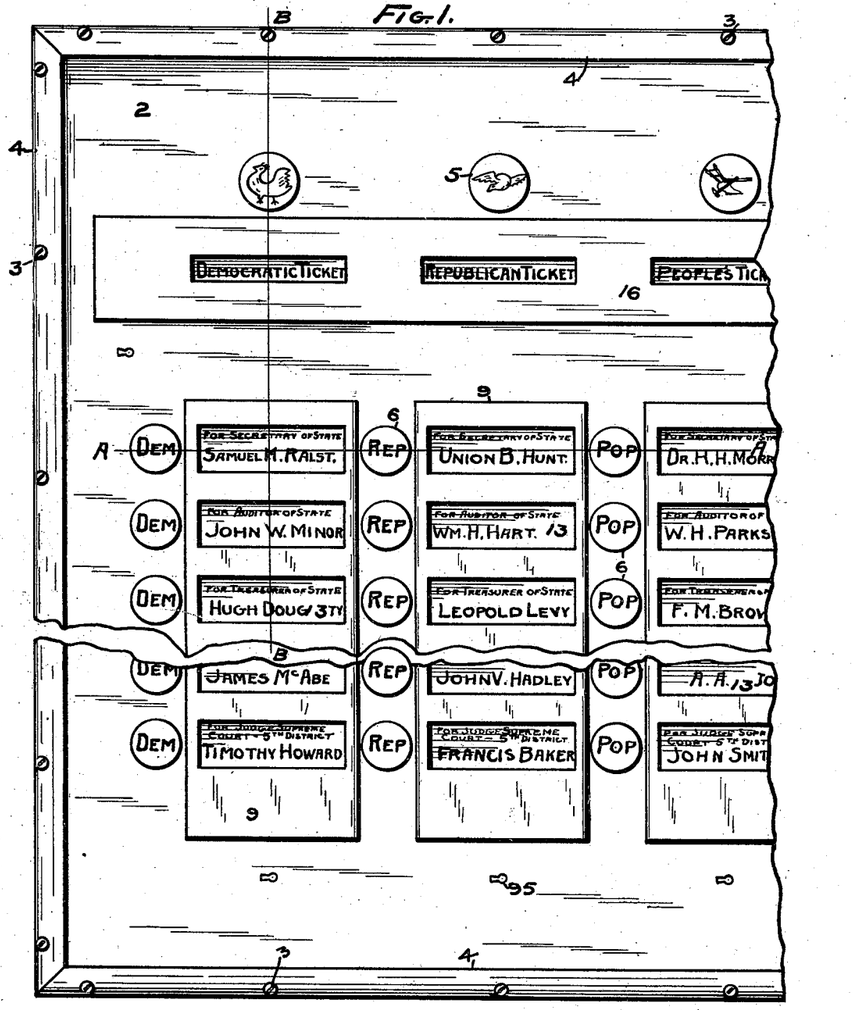
Figure 1 is a front elevation of the machine, portions being broken away.
Figure 2:
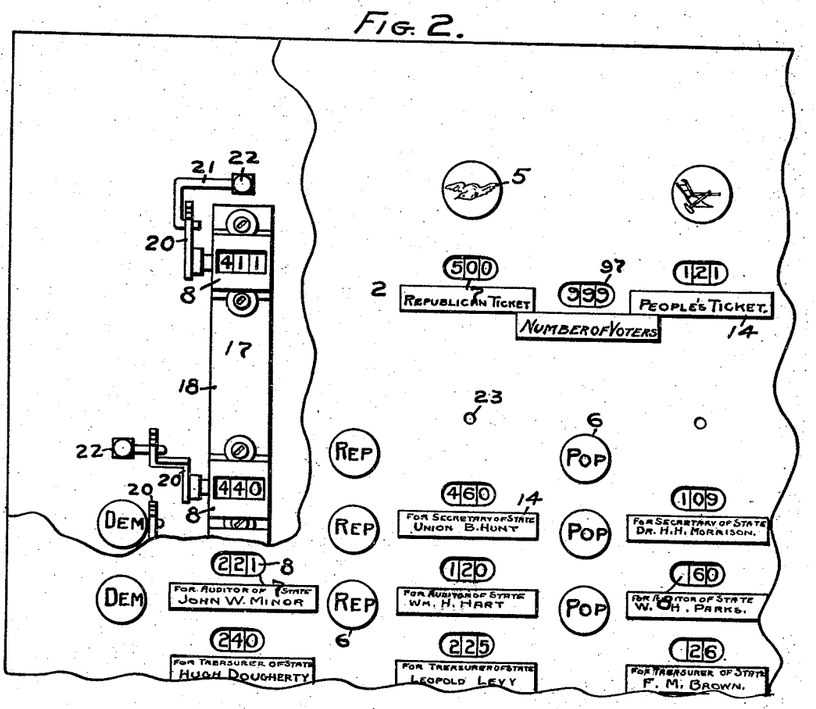
Fig. 2 shows a portion of Fig. 1, with the ticket-holding plates and glass and ticket thereunder removed and a portion of the top plate cut away to show the counters and the means for actuating the same, two of the push-buttons being removed.
Figures 9, 10, 11:
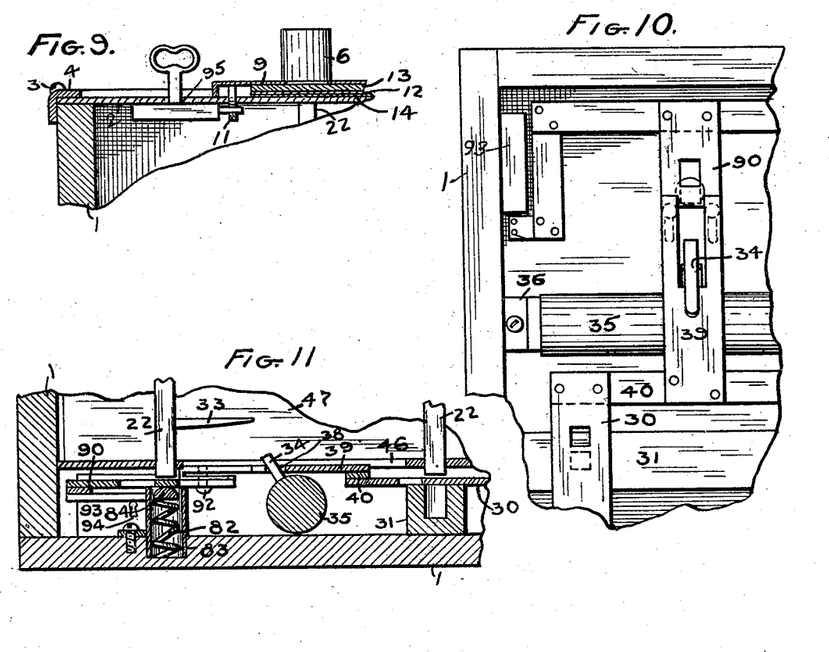
Fig. 9 is a detail of the means for locking and unlocking the ticket-holding plate.
Fig. 10 is the upper left corner of Fig. 8, with the total-lock for locking up the whole machine, said lock being actuated.
Fig. 11 is a detail of the lower left corner of Fig. 5 after the total-lock is actuated.

In the machine herein shown to illustrate the general nature of my invention a casing or box is formed of a bottom and four sides, with an open top, into which the parts of the machine are placed and fitted. Upon the box a plate 2 is secured by the screws 3, that extend through the molding 4 and the plate 2 into the sides of the box. Said plate 2 is perforated, as shown in Fig. 2, for the passage through it of the straight-ticket push-button 5 and the push-buttons 6 of the individual candidates, and there are openings 7 for the disclosure of the figures shown by the counters 8, which are immediately beneath said plate 2, as appears in Figs. 3 and 5. As shown in Fig. 1, there is a cross-row of the push-buttons for voting the straight tickets, one for each ticket, and the push-buttons 6 for the individual candidates are so arranged that those for candidates for the same office are in a cross-row and those for the candidates on the same ticket are in a vertical row, exactly located as the names of candidates and offices on ballots used in what is known as the "Australian ballot system." On plate 2 I place a ticket-holding plate 9, with large openings, one opposite to and to the right of each push-button 6. Said plates 9 are secured removably in place by means of the finger or hook 10 at one end, (see Fig. 5,) that is insertible through a suitable aperture 23 in the plate 2. At the other end of the ticket-holding plate I provide on the under side a U-shaped loop 11, that is insertible through a suitable aperture in the plate 2, as appears in Fig. 9. After the ticket-holding plate is put in place it is locked by means shown in Fig. 9 and which will hereinafter be explained. As appears in Fig. 3, the sides of the ticket-holding plate 9 are turned down to leave room for the ticket 12 and loose glass plate 13 above it. There are separate cross-strips of paper 14 pasted on or secured to the plate 2 immediately under the apertures 7, that disclose the counters, said strips of paper containing the names of the candidates to whom the counter disclosed immediately above it relates. The said apertures 7 for the counters are hidden by the ticket 12. Therefore while the voting is in progress the machine does not disclose the vote cast for any ticket or candidate. After the voting has ended the ticket-holding plates 9 are removed, and also the glass plates 13 and tickets 12, thus leaving what appears in Fig. 2—the apertures 7, with the vote for each candidate disclosed therethrough and the names of the candidates immediately under the respective apertures. The arrangement regarding the straight-ticket voting is in this particular substantially the same. The cross-plate 16 is provided with openings in it to disclose the name of the party ticket, that is printed on a piece of cardboard like the other tickets, with a glass above, as shown in the upper part of Figs. 5 and 6. The plate 16 is secured to the plate 2 in the same way that the ticket-holding plates 9 are secured.

The counters 8 are mounted on the bars 17, one for each party ticket, and said bars are secured on the plate 18, that rests loosely on the angle-plates 19. The counters are not new and any old form of counter is capable of use in my machine; but the means for operating the counter herein shown constitutes a part of my invention. I provide an open slot in the outer end of the crank 20, which actuates the counter, as appears in Figs. 5 and 6. The crank is actuated by the end of the pin 21, that is rigidly secured in the reciprocable push-rod 22, on the outer end of which the push-button 5 or 6 is secured. The inward pressure of the push-button actuates the counter, and thus the votes are mechanically added as the voting proceeds.

The interlocking mechanism whereby if one candidate for an office is voted for the machine is locked against all other candidates for the same office and the straight-ticket keys are also locked or if a straight-ticket key is first operated the whole machine is locked against further operation by such voter will now be explained.

Figure 3:
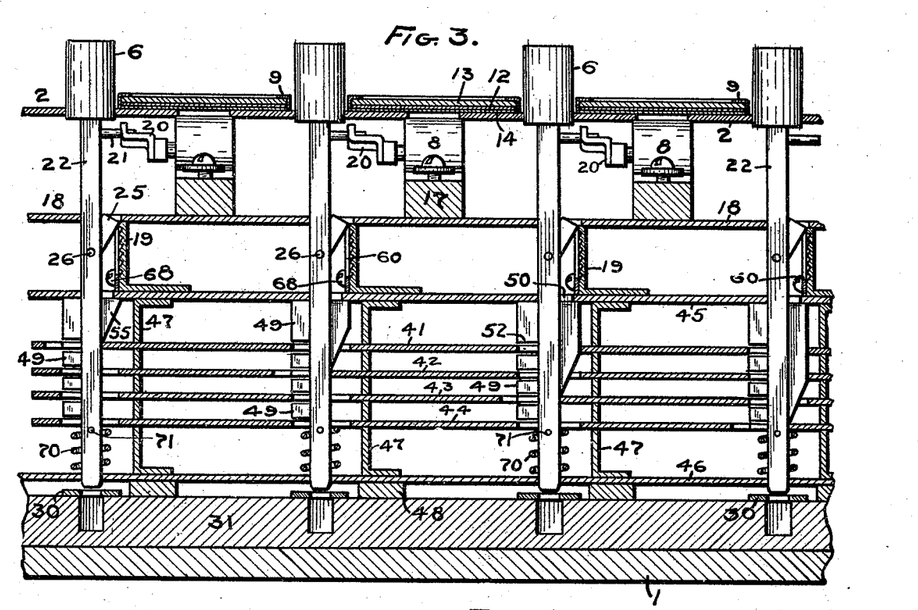
Fig. 3 is a horizontal section on the line A A, Fig. 1, showing the push-rods unoperated.
Figure 4:
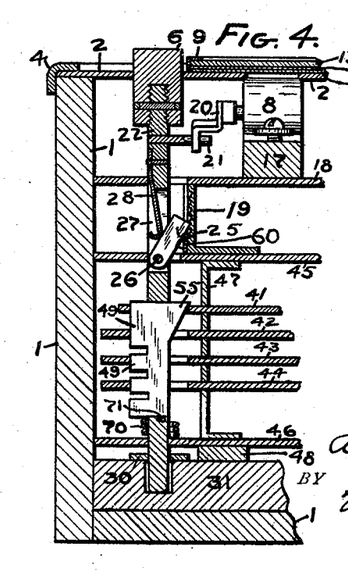
Fig. 4 is a section similar to that of Fig. 3, substantially with push-button and rod in section and showing same operated.
Figure 5:
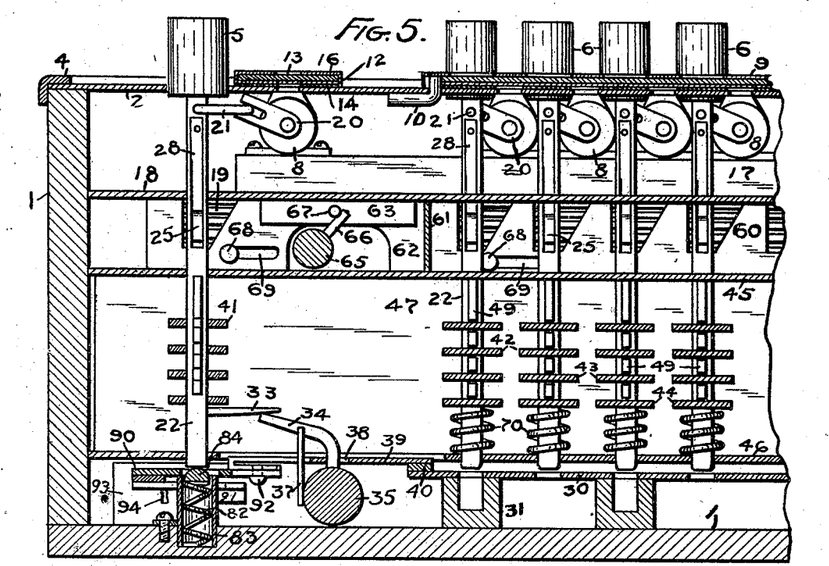
Figure 6:
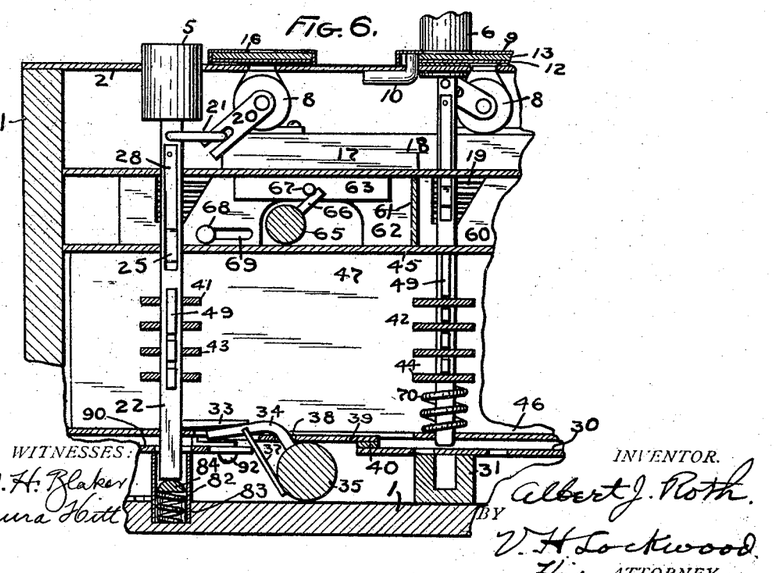
Fig. 6 is a part of Fig. 5, showing a straight-ticket push-button operated.
Figure 8:
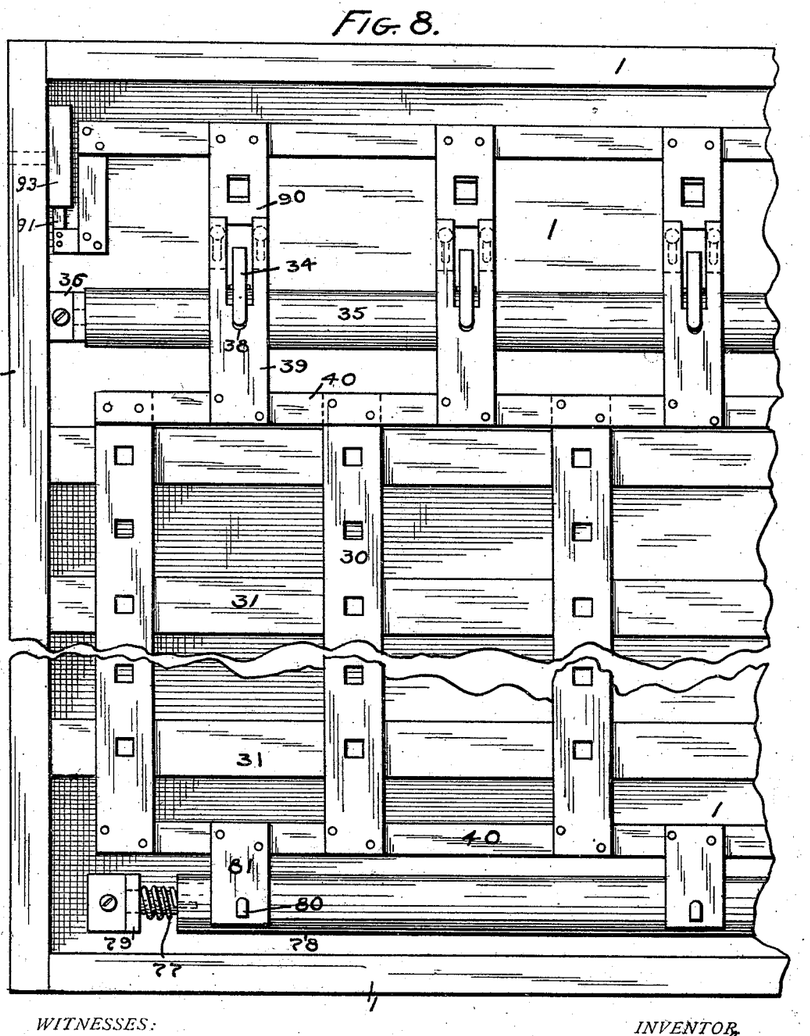
Fig. 8 is an elevation of the box or casing with all parts removed except the locking means actuated by the straight-ticket push-rod.

As the push-button is actuated or pressed inward the pawl 25, that is pivoted by the pin 26 in the slot 27 in the push-rod, engages the rack or notches on the side of the angle-plate 19, which prevents the return of the push button or rod, as appears in Fig. 4. The unactuated position of the push-rod 22 is shown in Fig. 3. The pawl is held in engagement with the angle-plate 19 by the spring 28. (Seen in Fig. 4.) The lower ends of the push-rods 22 are adapted to penetrate apertures in the bars 30, near the bottom of the machine, which are formed into a frame and slidable on the stationary cross-bars 31, as appears in Figs. 3, 4, 5, 6, and 8. Said cross-bars 31 also have apertures to register with the apertures in the bars 30 at times, and when they register the push-buttons and push-rods can be actuated. When the bars 30, by a movement of the frame shown in Fig. 8, are moved, the apertures therein are not beneath the ends of the push-rods 22, and the push-rods for individual candidates are locked against operation. This result is accomplished when a straight ticket is voted by the following means: Each straight-ticket push-button, as appears in Figs. 5 and 6, is connected with a push-rod 22, that carries near its lower end a rigid finger 33, that when depressed engages a rigid arm 34, secured to the oscillatory rod 35, horizontally placed in the machine and mounted at each end in the brackets 36, secured to the bottom of the box, as appears in Fig. 8. The arm 34 is made more secure by the rigid brace 37. The depression of the straight-ticket push-rod 22 by actuating the arm 34 slides the whole locking-frame, including all the bars 30, to the left, as shown in Figs. 5, 6, and 8. This result follows because the arm 34 extends through a slot 38 in the plate 39, that is secured to the cross-plate 40, to which all of the bars 30 are riveted and which constitutes said locking-frame. The position of said parts after a straight ticket is voted appears in Fig. 6 and, as seen there, the push-rod 22 to the right cannot be depressed. The shifting of this locking-frame, including the bars 30, effectually locks the machine and prevents voting for any individual candidate.

Figure 12:
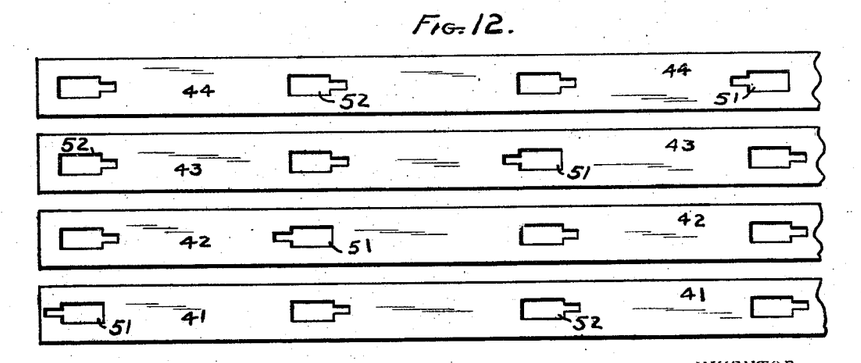
Fig. 12 is a plan of the cross-row locking-bars laid side by side.

The means for locking the push buttons and rods in any cross-row, whether straight ticket or individual candidates for the same office, is as follows: I mount in the mechanism a series of cross locking bars or plates 41, 42, 43, and 44, as appear in Figs. 3 and 4, one for each push-rod. Since four tickets are here shown, four of said locking-bars are shown. They are mounted so as to be longitudinally slidable somewhat in a frame formed of a top plate 45, a bottom plate 46, and intermediate plates 47, said last-mentioned plates being suitably apertured to permit the passage and movement of said locking-bars 41 to 44. The top plate 45 has the angle-plate 19 secured to it, and the lower plate 46 is secured to the bars 48, that rest upon the cross-bars 31, heretofore mentioned, and are located between other locking-bars 30. The locking-bars 41 to 44 and also the top and bottom plates 45 and 46 are apertured to permit the passage and movement of the push-rods 22, as appears in Figs. 3 and 4. The apertures in the bottom plate 46 are merely large enough to permit the passage of the push-rod. The apertures 50 in the top plate 45 are laterally long enough to prevent interference with the operation of the pawls 25 when the push-rods are depressed, as shown in Fig. 4. The locking-bars 41 are provided with apertures for the passage of the push-rods, as appears in Figs. 3 and 4 and as is shown in the plan of said bars in Fig. 12. There are two classes of these apertures, one class, 51, having an extension to the left and the other class, 52, with an extension to the right. Each bar has one aperture of the former class and all the other apertures are of the latter class. The aperture 51 is what may be called the "actuating" aperture or the aperture for the push-rod that actuates the bar in which the aperture is locked. The bars are pushed to the right, as shown, by the inclined lugs 55, that are secured to the push-rods, so that the lower point of the inclined lug will be adjacent to the locking-bar when the push-rod to which said lug is attached is unoperated. For that reason the inclined faces of the lugs 55 vary in position, as shown in Fig. 3, to suit the position of the bars. On the push-rods there are stops or shoulders 49, having between them recesses in line with the locking-bars, so that when a locking-bar moves it enters one of said recesses, or rather passes under one of said stops or shoulders 49, and thereby prevents the depression of the other push-rods. To illustrate, when the push button and rod (shown in Fig. 4) are depressed the inclined face of the lug 55 forces the locking-bar 41 to the right under the top shoulder or stop 49 on the other push-rods in the same cross-row, whereby all of said push-rods are locked from operation. If the second push-rod from the left (shown in Fig. 3) were depressed, the inclined face of the lug 55 would pass through the aperture 52 in the locking-bar 41 without actuating said locking-bar and will actuate the locking-bar 42. The next push-rod to the right would actuate the locking-bar 43, and the fourth push-rod would operate the locking-bar 44 and not the others, so that each push-rod has its own locking-bar for locking the other push-rods in the cross-row from operation. The same construction is employed to lock the straight-ticket push buttons and rods when one of them is operated.

The chief advantage of the means described for interlocking is positiveness and strength. There cannot be an operation of a key without causing the interlocking, and when interlocked the machine cannot be operated or interfered with, even if a man should strike the push-buttons with a hammer. Every plate and every locking-bar are moved under a flat shoulder or surface, the movement of which it can easily resist regardless of the amount of force employed short of destruction of the machine.

The unlocking is accomplished merely by releasing the pawls 25 from the racks or notches in the angle-plates 19. Said pawls are released by the inclined lugs, faces, or edges on the plates 60, that extend through the machine adjacent the notched faces on each angle-plate 19, and therefore are beneath or back of the pawls 25, as appears in Figs. 3 and 4. The plates 60 are secured to the cross-bar 61, which in turn is secured to the plates 62, which latter have secured to them the reinforcing-strips 63. This makes an unlocking-frame that is actuated by a key or lever or any other means applied to the end 64 of the rod 65, (appearing in Fig. 7,) so mounted as to be oscillatory. The pins 66 in said rod engage the pins 67 from the reinforcing-strips 63. The plates 62 and 60 are held in place against the toothed surface of the angle-plates 19 by the pins 68, secured to the angle-plate 19 and which extend through the slots 69 in the plates 60 and 62. This merely guides and limits the movement of said unlocking-frame. When said unlocking-frame is actuated, the inclined faces on the plates 60 and 62 move under all the pawls 25 in the machine and elevates them so as to disengage them from the notched surface of the angle-plates 19. When the pawls 25 are disengaged, the push-rods 22 are immediately returned to their normal unoperated position by the compressed springs 70, which rest and act against the plate 46 and pins 71 in the push-rods, as appears in Figs. 3 and 4. When the push-rods 22 are returned to normal, the locking-bars 41 to 44 are likewise returned to the unoperated position by the compressed springs 73, (to be seen in Fig. 7,) that bear at one end against shoulders on said locking-bars and at the other end against the plates 47, as appears in Fig. 7. The locking-bars 30, that are actuated when voting the straight ticket, are returned to a normal position by the torsional action of the spring 77, having one end fastened in the roller 78 and the other in the bracket 79, in which said roller is mounted. The pins 80 secured to said roller extend through suitable apertures in the plates 81, connected to one of the cross-bars 40. When the spring 77 oscillates the roller 78, it throws the whole frame, including the locking-bars 30, over from the position shown in Figs. 6 and 8 to the position shown in Fig. 5.

The straight-ticket push-rods are returned to normal position by the spring 82, operating in a barrel 83, embedded in a hole in the bottom of the box or casing 1 and bearing against a head 84, that has an oval upper surface to engage the lower end of the push-rods. The oval surface is immaterial in returning the push-rod to its normal position, but has another function hereinafter explained. The unlocking-frame, including plates 60 and 62, is returned to the unoperated position, with the torsional spring 85 acting on the oscillatory roller 86, mounted in the bearing-brackets and having the pin 87 extending loosely through an aperture in the plate 88, that is secured to the bar 89, to which the unlocking-plates 60 are secured. This action occurs as soon as the roller 65 is released from the action of the key or crank placed on the end 64.

Means are provided whereby with an independent or pocket key the whole machine may be locked by an officer against use. This appears in Fig. 5 at the lower end and also in Fig. 11. To that end I provide means for shifting the locking-frame, including the bars 30, with the outside key, so as to prevent the operation of the individual-candidate push-buttons. I provide a plate 90, having in it a slot through which the pin 92 from the plate 39 loosely extends, said slot being of such length that the pin 92 will be at one limit of its movement when the locking-plates 30 are in a position to enable the push-buttons to be operated. The slot permits the movement of the bars 30 to the left, as shown in Fig. 5, by the operation of the straight-ticket key, as heretofore explained, without changing the position of the plate 90. A lock 93 is provided, so that when actuated by an independent key in the keyhole 94 the plate 90, that is connected to the bolt 91 of the lock, will be moved to the left from the position shown in Fig. 5 to the position shown in Fig. 11, so said plate 90 will obstruct the operation of the straight-ticket push-rod 22. The movement of the plate 90 will by means of the pin 92 throw the locking-plates 30 from the position shown in Fig. 5 to the position shown in Fig. 6. Then no push-button in the machine can be operated. The plate 90 in moving encounters the oval surface of the head 84 and pushes it down into the barrel 83 out of the way. The machine is unlocked by turning the key in the opposite direction, so as to return the plate 90 to the position shown in Fig. 5. The lock 93 is of a simple old form that throws a bolt.

Access to the tickets within the ticket-holders 9 and 16 is prevented by locking said holders in place by a lock 96 (shown similar to lock 93) and using an independent key in the keyhole 95, so the bolt of the lock will enter the loop 11.

Figure 13:
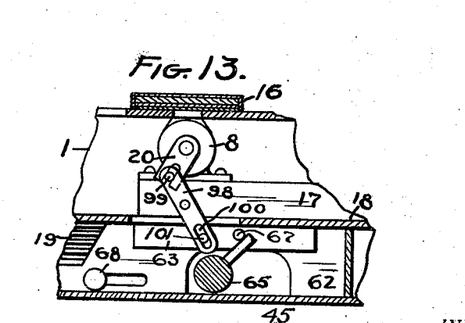
Fig. 13 is a side elevation of the total-vote-adding mechanism.

In Fig. 13 I show means provided for indicating the total number of voters who have used the machine. The same kind of counter 8 is provided and mounted in the same way as the other counters under the aperture 97 in plate 2. (See Fig. 2.) Said counter has the same slotted crank 20, but instead of being actuated by a push-rod is actuated by the operation of the unlocking-frame as the voter leaves the booth or the machine is unlocked and reset for another voter. As shown in Fig. 13, a lever 98 is centrally pivoted to one of the stationary bars 17 with pin 99 in one end that enters the slot in the crank 20. The other end of said lever has a slot 100, into which a pin 101 extends that is rigidly secured to the reinforcing-strip 63 on one of the plates 62. Therefore when said plate 62 is moved to the left, as shown in Fig. 13, to unlock the parts of the machine, as heretofore described, the counter will be actuated. This arrangement is preferably placed about the middle of the machine, under the straight-ticket-holding plate 16.

Figure 7:
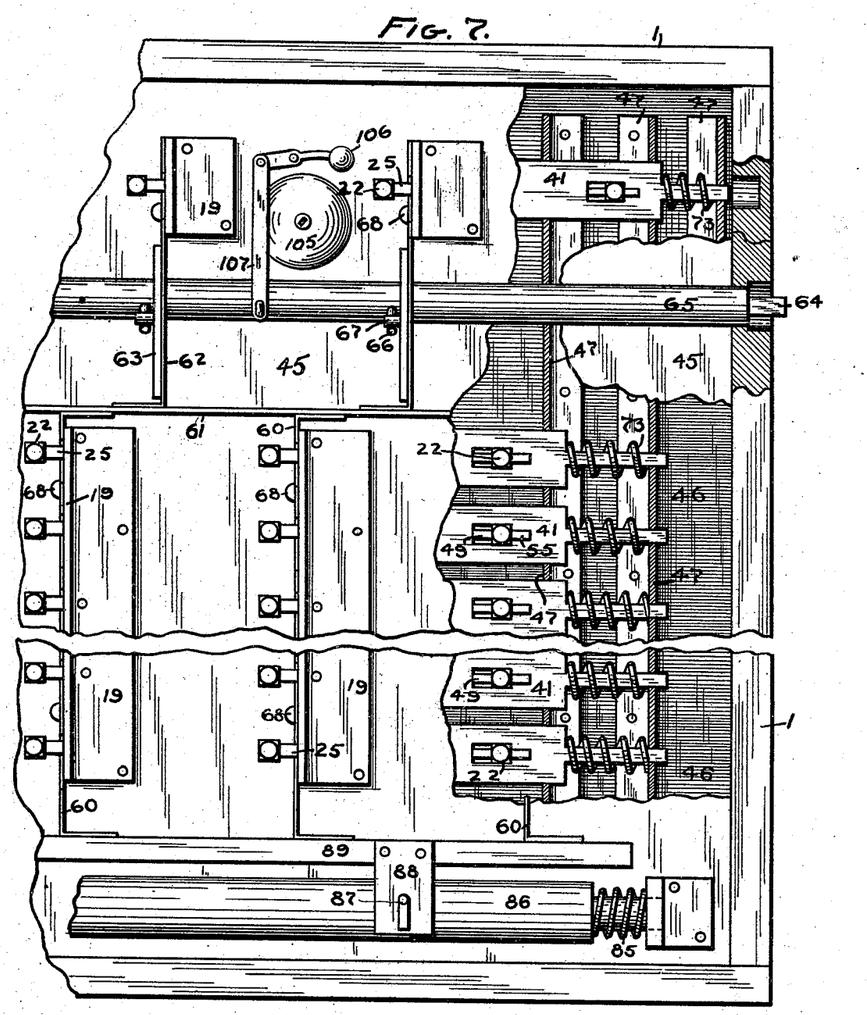
Fig. 7 is an elevation of the machine with the push-buttons, two outer plates, and counters removed, and a part of the third plate being broken away to show the construction beneath.

From the foregoing description it is seen that the general requirements of the Australian-ballot system are complied with in this machine and that the parts are so simple and so arranged that they cannot be affected or injured by rough usage or any ordinary attempt to disable any part of the machine. The election officers carry keys to lock the entire machine from use or to unlock it for use; also, a key enabling them to remove the ticket-holding plates and tickets in order that the total number of votes received by each party and each candidate will be directly and immediately disclosed. While the resetting mechanism is here shown adapted to be operated by a crank or key applied to the end 64 of the roller 65 when the machine is placed in the booth, such connection as may be desired may be made between the exit-door of the booth and said roller 65 to enable said exit-door as the voter leaves the booth to actuate the roller 65. No such mechanism is here shown, as there is no invention in it, and I do not wish to be limited to any particular means for actuating said roller 65 to reset the machine. Means are also provided for keeping count of the total number of voters. It is apparent, however, that nobody can vote for more than one candidate for the same office or for the same candidate more than once, nor can a voter do anything further with the machine after voting the straight ticket. The arrangement is also such that any accidental actuation of a push-button will not count or actuate the counters, as said counters are not actuated until the push-button is pushed down a considerable distance—more than half-way. When the push-button is pushed slightly, however, the pawl 25 will catch in the first notch of the plate 19 or second notch without actuating the counter, so that if a voter wishes to complete the actuation of the said push-button he can do so, but not if in the meantime he has voted a straight ticket or actuated any other push-button in the same cross-row. This result, however, is attained by the adjustment of the counter-crank 20 and pin 21 on the push-rods. The mechanism herein merely shows a construction capable of bringing about the result just described if the counter-crank 20 and pin 21 are properly adjusted. When the machine is released, after a voter has voted and is reset for the next voter a gong 105 is sounded by the hammer 106, operated by the resetting-shaft through the bar 107, to indicate that a man has voted and to prevent any operation of the machine without the knowledge of the election officers. The gong is shown in Fig. 7.

The push-rods are limited in their actuation by the lower ends striking the bottom of the box or some stationary object. This stop is so located as to prevent the push-rod being so actuated as to let the top of the inclined lug 55 pass below the top locking-bar 41. With this stop arrangement no reasonable blow or amount of pressure on the push-rod can further actuate it or injure any of the internal parts of the machine.

It is observed that the construction of this machine is such as to permit the push-rod being located to the left of the ticket, where the mark in the Australian-ballot system is placed, so that its location will be familiar to the voter.

What I claim as my invention, and desire to secure by Letters Patent, is—

1. In a voting-machine, a row of push-rods, a pawl pivoted to each of the same, a rack beside each push-rod for engaging the pawls and a common means for disengaging the pawls from the rack.

2. In a voting-machine, a row of push-rods, a pawl pivoted to each of the same, a plate through which said rods may reciprocate, an angle-bar secured on said plate near the row of push-rods and having the face thereof adjacent said push-rods notched for engaging the pawls on the push-rods and means for simultaneously disengaging the pawls from the notched plate.

3. In a voting-machine, a series of push-rods with stops and locking-bar-actuating lugs thereon, and a series of independent locking-bars through all of which said push-rods extend, there being a separate bar for each push-rod to actuate that, when actuated, stops the other push-rods.

4. In a voting-machine, a series of push-rods, a series of apertured locking-bars slidably mounted one for each push-rod and one above the other and through which the push-rods loosely extend, an inclined lug on each push-rod to operate its particular locking-bar, and stops on the push-rods under which the locking-bars move when operated.

5. In a voting-machine, a series of push-rods, a frame formed of two parallel plates at a right angle to the push-rods and apertured for the passage of the push-rods and which are secured to a series of intervening plates, a series of locking plates or bars one for each push-rod slidably mounted in said intervening plates and apertured for the passage of the push-rods, an inclined lug on each push-rod arranged to actuate a locking plate or bar when its corresponding push-rod is actuated, and stops on the push-rod to prevent the actuation of any push-rod in the series after one of the locking plates or bars has been actuated.

6. In a voting-machine, push-rods to be actuated by the voter, a slidable plate or frame beyond the ends of the push-rods with apertures to permit the movement of the push-rods, and means actuated by one push-rod for moving said plate or frame into the path of the end of the other push-rods.

7. In a voting-machine, push-rods to be actuated by the voter, one for each straight ticket, and a row for all the individual candidates on each ticket, a slidable frame and a plate beyond the ends of each row of push-rods apertured to permit the movement of the push-rods, and means actuated by one of the straight-ticket keys for moving said frame into the path of all the push-rods for the individual candidates.

8. In a voting-machine, push-rods to be actuated by the voter, including one for each straight ticket, and push-rods for all the candidates on a ticket arranged in a row, a slidable frame having a plate beyond the end of each row of push-rods apertured to permit the movement of the push-rods, a plate connected with said frame extending into close proximity to each straight-ticket push-rod, an oscillatory frame extending loosely through an aperture in said plates, and a finger rigidly connected with the straight-ticket push-rods that engages said frame when the straight-ticket push-rod is depressed and thereby moves said slidable frame beneath the push-rods for all the individual candidates.

9. In a voting-machine, push-rods to be actuated by the voter, a pawl pivoted to each push-rod, a rack or notched plate for said pawl to engage, and a sliding plate between the push-rod and the notched plate with an inclined face for disengaging the pawl from the notched plate.

10. In a voting-machine, push-rods arranged in rows to be actuated by the voter, a pawl pivoted to each push-rod, a notched plate adjacent the push-rods for engaging the pawls, and a plate slidable between the notched plate and row of push-rods with a series of inclined faces to disengage the pawls of all the push-rods in the row from the notched plate.

11. In a voting-machine, a number of push-rods arranged in a number of rows, a pawl pivoted to each push-rod, a notched plate for the push-rods to engage, a slidable frame including a plate between each row of push-rods and the notched plate and having an inclined face near each push-rod, and means outside of the machine for actuating said frame whereby the pawl on all the push-rods will be simultaneously disengaged from the notched plates.

12. In a voting-machine, a number of push-rods arranged in a number of rows, a pawl pivoted to each push-rod, a notched plate for the push-rods to engage, a slidable frame including a plate between each row of push-rods, and a notched plate for disengaging the pawls of the push-rods and having an inclined face near each push-rod, and a spring for returning each push-rod to its unoperated position when said unlocking-frame is operated.

13. In a voting-machine, a number of push-rods arranged in a number of rows, a pawl pivoted to each push-rod, a notched plate for the push-rods to engage, a slidable frame including a plate between each row of push-rods and the notched plate and having an inclined face near each push-rod, and a spring for returning said slidable frame to its unoperated position.

14. In a voting-machine, a row of push-rods, pawls pivoted to the push-rod for holding said push-rods when they are actuated, a sliding plate for releasing the said pawls, means for returning the push-rods to their unoperated position, stops on said push-rods, a locking-bar actuated by one of said push-rods and locking the others against actuation, and a spring for returning the said locking-bar to its unoperated position when said pawl is released.

15. In a voting-machine, a row of push-rods, a pawl pivoted to each push-rod for holding the same when it is actuated, means for disengaging the pawls and returning the push-rods to their unoperated position simultaneously, a series of locking-bars one for each push-rod, an inclined lug on each push-rod for actuating its corresponding locking-bar, stops on the push-rods for engaging the locking-bars to prevent actuation of the push-rods, and a spring connected with each locking-bar to return it to the unoperated position when the push-rods are released.

16. In a voting-machine, a number of push-rods, a slidable frame at the ends of the push-rods, means for moving said frame into the path of the ends of the push-rods, and a spring for withdrawing said frame to its unoperated position when released.

17. In a voting-machine, a number of push-rods, a frame near the ends of the push-rods, a lock actuated by the key outside of the machine, and a connection between the bolt of said lock and sliding frame whereby said sliding frame may be moved into the path of all the push-rods to lock them.

18. In a voting-machine, a series of straight-ticket push-buttons for the individual candidates, a slidable frame with plates near the ends of the individual-candidate push-rods that when moved will prevent the operation of such push-rods, means actuated by each straight-ticket key for moving said frame, a sliding plate beneath each straight-ticket push-rod having a slot in it, a pin secured to the sliding frame that extends loosely through said slot whereby when said sliding plate is actuated the sliding frame will be actuated and the sliding frame can be actuated without affecting the sliding plate, and a lock actuated by a key outside with its bolt connected with said sliding plate.

In witness whereof I have hereunto affixed my signature in the presence of the witnesses herein named.

ALBERT J. ROTH.

Witnesses:
JOHN L. MAY,
FRED H. HALL.